United States Patent
McIntosh et al.

[11] Patent Number: 6,003,224
[45] Date of Patent: Dec. 21, 1999

[54] APPARATUS FOR ASSEMBLING HEAT EXCHANGER CORES

[75] Inventors: Douglas James McIntosh, Ann Arbor; Thomas Steven Crutchfield, Dearborn, both of Mich.

[73] Assignee: Ford Motor Company, Dearborn, Mich.

[21] Appl. No.: 09/173,647

[22] Filed: Oct. 16, 1998

[51] Int. Cl.[6] .................................................. B23P 15/26
[52] U.S. Cl. ........................... 29/726; 29/726.5; 29/727; 29/890.047
[58] Field of Search ........................ 29/726, 727, 726.5, 29/464, 466, 467, 468, 890.047, 890.045

[56] References Cited

U.S. PATENT DOCUMENTS

| | | |
|---|---|---|
| 4,321,739 | 3/1982 | Martin et al. . |
| 4,486,933 | 12/1984 | Iwase et al. . |
| 4,611,375 | 9/1986 | Zapawa . |
| 4,637,132 | 1/1987 | Iwase et al. . |
| 4,660,264 | 4/1987 | Rogers, Jr. . |
| 4,942,654 | 7/1990 | Wright et al. . |
| 5,014,422 | 5/1991 | Wallis . |
| 5,206,990 | 5/1993 | Wright . |
| 5,653,928 | 8/1997 | Schnipke . |
| 5,680,695 | 10/1997 | Vetter . |

*Primary Examiner*—I Cuda
*Attorney, Agent, or Firm*—Raymond L. Coppiellie

[57] ABSTRACT

An apparatus for forming heat exchanger core assemblies having a plurality of generally elongate tubes seated in uniformly spaced openings in a pair of spaced parallel header members is disclosed. The apparatus includes a generally flat, horizontal support table and a pair of header carriers mounted for horizontal reciprocatory movement respectively toward and away from two opposed sides of the table. The apparatus further includes a pair of elongate, horizontally disposed guide members for locating and aligning a plurality of tubes with the respective openings in header members. Each of the guide members includes a base portion and a plurality of finger members, each finger member projecting in a first position vertically upwardly from the base portion. The guide member further includes a plurality of upwardly opening elongate, tube receiving slots between the finger members, the slots extending parallel to the adjacent side of the table. The guide members are formed from an elastomeric material, such as a polyurethane, so that each of the finger members can be deformed elastically under imposition of a lateral force thereagainst and return to an original position when the force is removed.

15 Claims, 3 Drawing Sheets

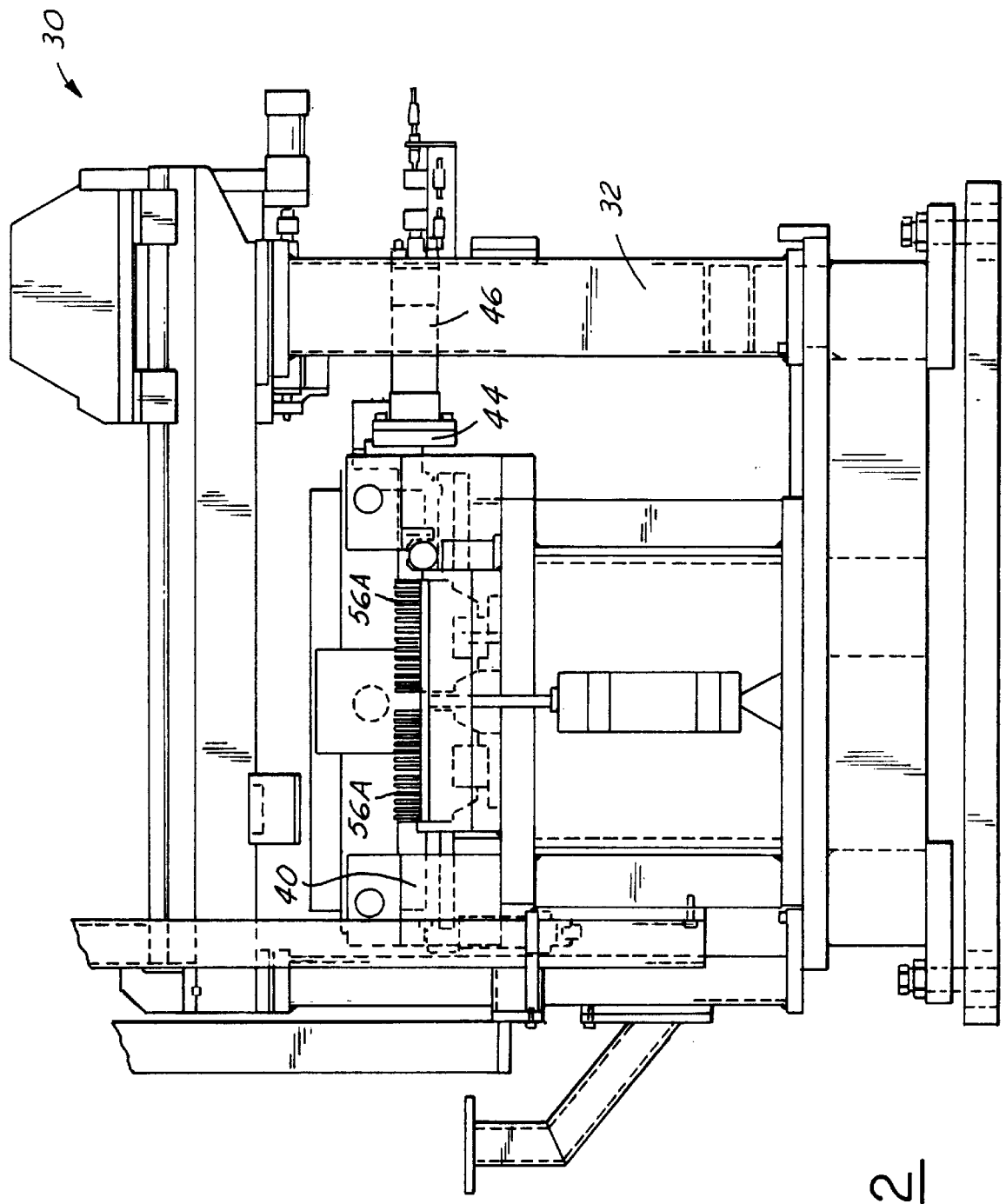

APPARATUS FOR ASSEMBLING HEAT EXCHANGER CORES

BACKGROUND OF THE INVENTION

1. Field of the Invention

The present Invention relates generally to machines for building heat exchanger cores. More particularly, the present invention relates to such machines have a guide mechanism for properly aligning the tubes of the core during manufacturing.

2. Disclosure Information

Known heat exchanger cores typically include a plurality of flattened tubes with undulating fins, top and bottom end plates or endsheets extending parallel to the tubes and side header plates through which the ends of the tubes extend. Such core assemblies are used in automotive radiators, heater cores, condensers, evaporators and the like.

To manufacture such core assemblies, it has been known to provide an array of flattened tubes, interposing the fins between the tubes, simultaneously apply forces to the ends of the tubes to bring the tubes in general alignment, then compacting the tubes transversely, forcing the header plates over the ends of the tubes and deforming the ends of the tubes. The array of tubes can be formed by disposing the tubes into an alignment device which aligns the tubes in properly order and provides space between the tubes for the fins.

One type of alignment device comprises a hardened steel mechanism often referred to as a "picket" because of its resemblance to a picket fence. The picket includes a plurality of hardened steel fingers which receive tubes between the fingers. This machinery works very well, except when the tube dispensing device misfeeds the number of tubes per slot. When this happens, the fingers plastically deform and the guide member must be repaired or replaced.

Another type of alignment device is described in U.S. Pat. Nos. 4,611,375 and 5,014,422. These patents teach individual finder assemblies linked together by a chain or other device. The fingers can be moved relative to one another to provide a wide space for the tubes and fins. After the tubes and fins are in place, the chain moves the fingers together to exert a clamping force to properly locate the tubes with respect to their respective headers. These devices are expensive and very complex.

Therefore, it would be advantageous to provide a mechanism which is less costly and complex, but which can overcome the problems associated with tube misfeeding. It is an object of the present invention are to provide an improved apparatus wherein the tubes need not be delivered to that initial array in such precise fashion and wherein the tube guiding device is elastically deformable.

SUMMARY OF THE INVENTION

The present invention overcomes the disadvantages of the prior art by providing an apparatus for forming heat exchanger core assemblies having a plurality of generally elongate tubes in uniformly spaced, parallel relationship with each other with the opposite ends of the tubes seated in uniformly spaced openings in a pair of spaced parallel header members. The apparatus comprises a generally flat, horizontal support table and a pair of header carriers mounted for horizontal reciprocatory movement respectively toward and away from two opposed sides of the table. The apparatus further includes tube aligning means for locating and aligning a plurality of tubes on the table with the respective openings in header members carried by the header carriers. The tube aligning means comprises a pair of elongate, horizontally disposed guide members extending parallel to and respectively adjacent the opposed sides of the table. Each of the guide members includes a base portion and a plurality of finger members, each finger member projecting in a first position vertically upwardly from the base portion. The guide member further includes a plurality of upwardly opening elongate, tube receiving slots between the finger members, the slots extending parallel to the adjacent side of the table. The guide members are formed from an elastomeric material, such as a polyurethane, so that each of the finger members can be deformed elastically under imposition of a lateral force thereagainst and return to the first position when the force is removed. The elastomeric material should have a hardness of between 70 to 85 Shore D.

It is an advantage of the present invention that guide members formed from this material will not absorb oils, will elastically deform when tubes are misfed and are economical to produce. It is a further advantage that guide members formed as such can include a coloring agent so as to coordinate machine equipment more easily within a plant environment.

These and other features, advantages and objects of the present invention will become apparent from the drawings, detailed description and claims which follow.

BRIEF DESCRIPTION OF THE DRAWINGS

FIG. 2 is a side elevational view of an apparatus structured in accord with the principles of the present invention for assembling heat exchanger core assemblies.

DETAILED DESCRIPTION OF THE PREFERRED EMBODIMENTS

Figure 1:
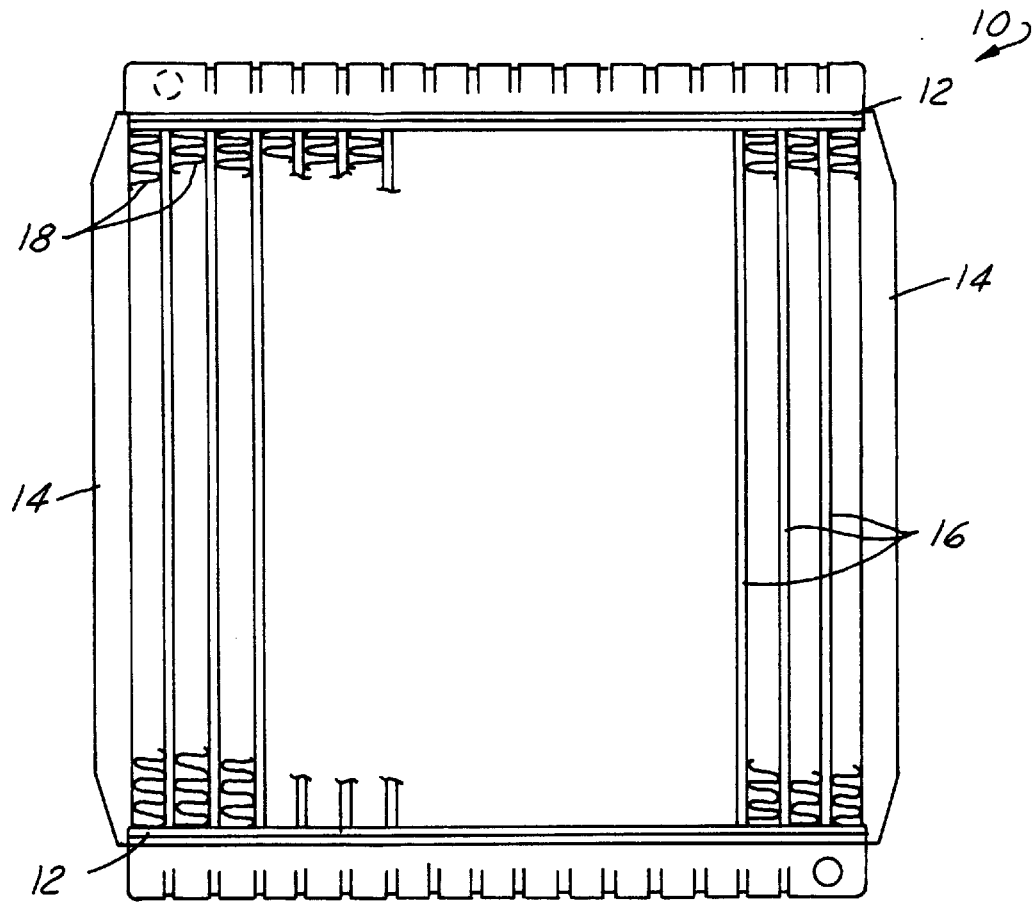
FIG. 1 is a perspective view of a heat exchanger core subassembly manufactured with the apparatus of the present invention.

Referring first to FIG. 1, the individual components of a heat exchanger core 10, such as a heater core or radiator core subassembly which is to be assembled in accordance with the present invention are shown in the perspective view of FIG. 1. The parts include a pair of headers 12 secured to a pair of tanks 13, a pair of side support frame members 14, a plurality of tubes 16 interleaved with a plurality of fins 18. In the assembled core subassembly 10, a pair of headers 12 and a pair of side frame members (or endsheets, depending upon the type of heat exchanger core) 14 are assembled into a rectangular outer framework. Within this outer framework, the plurality of tubes 16 extend in uniformly spaced, parallel relationship between headers 12, the ends of tubes 16 projecting through openings in headers 12 in conventional fashion. The tubes 16 have a flattened, elongate, generally rectangular transverse cross-section and the fins 18 are clamped between the flat sides of adjacent tubes 16 and between the side frames 14 and the adjacent endmost tube 16 of the array of tubes in the subassembly. The fins 18 are of elongate, zigzag configuration and are formed from a relatively thin metal strip. All of the individual components of the heat exchanger core are preferably constructed from aluminum and coated with a brazing compound. After the mechanical assembly of the various parts to be described below, the assembled core subassembly 10 is passed through an oven to firmly braze the parts to each other in their assembled relationship as is generally known in the art. The present invention will be described with reference to a heater core assembly, although the present invention can be used for assembling an type of tube-fin heat exchanger, such as a radiator or condenser.

Figure 3:
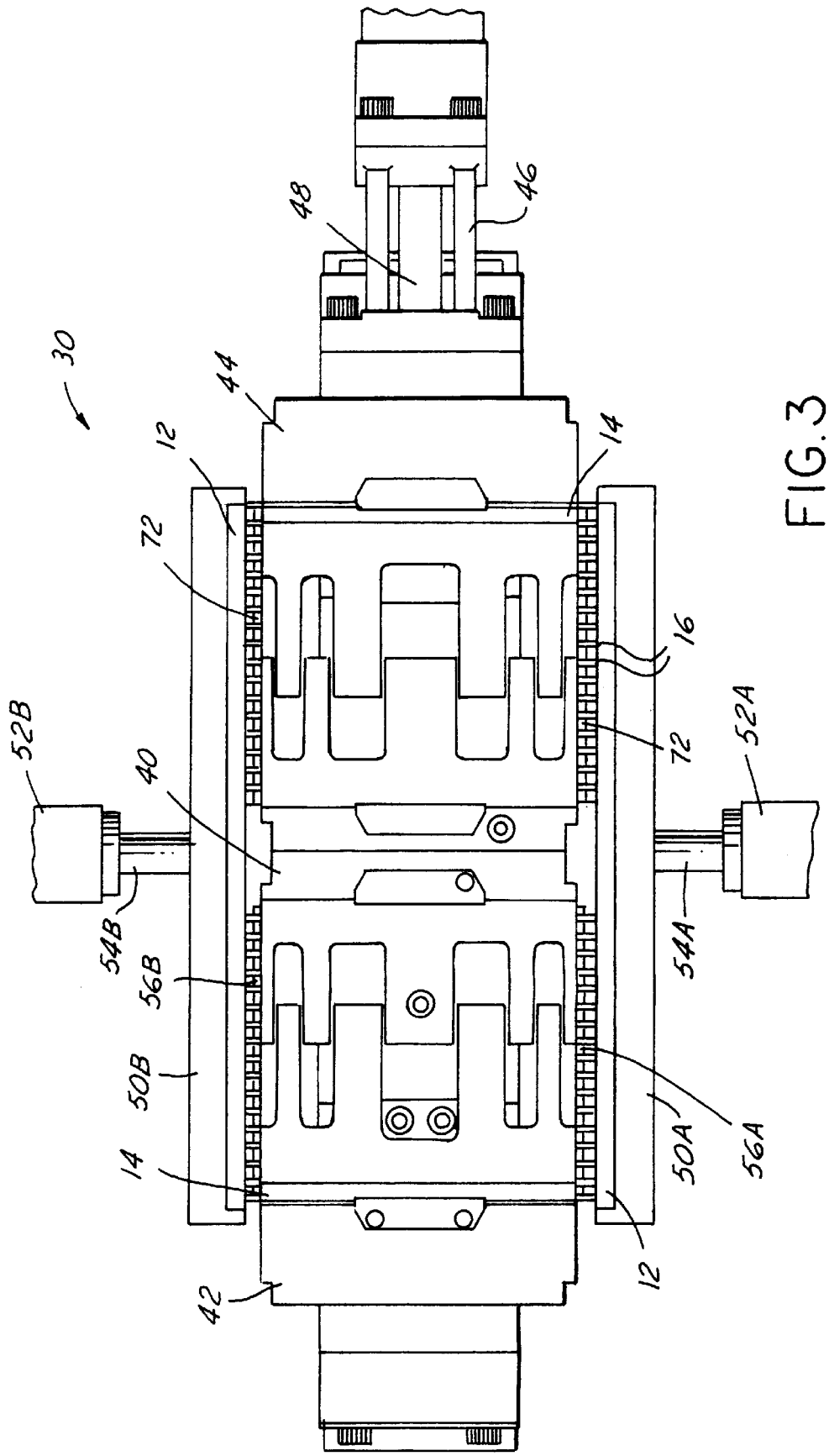
FIG. 3 is a top plan view of the apparatus of FIG. 1.

Referring now to FIGS. 2 and 3, an apparatus 30 for assembling the heater core from the components described above is shown schematically. The apparatus 30 includes a frame 32, a tube dispensing mechanism 33, and a horizontal, rectangular support table 40 fixedly mounted on the frame 32 of the machine. Referring now particularly to FIG. 2, a first side support frame carrier 42 is fixedly mounted upon the machine frame 32 to extend along one side of table 40 to detachably support a side frame 14 on the upper surface of table 40 along that edge of the table. A second side support frame carrier 44 is mounted adjacent the opposite side of table 40 to detachably support a side frame 14 in spaced, opposed relationship to the side frame 14 carried on the fixed support frame carrier 42. The second side frame support carrier 44 is mounted upon the machine frame for movement toward and away from the fixed support side frame carrier 42, this movement being accomplished by a hydraulic cylinder 46 fixedly mounted upon the machine frame and having a piston rod 48 coupled to carrier 44. As shown in FIG. 2, piston rod 48 is fully retracted into its cylinder 46 to locate carrier 44 in a position in which the side frame 14 on carrier 44 is spaced from the side frame 14 on fixed carrier 42 by a distance substantially greater than the spacing between the two side frames 14 when finally assembled into the subassembly. Actuation of cylinder 46 to extend piston rod 48 will drive carrier 44 toward carrier 42 until, at maximum extension of piston rod 48, the side frame 14 carried by carrier 44 is located in its final assembled relationship relative to the side frame 14 on fixed carrier 42.

A pair of header carriers 50A and 50B (shown schematically in FIG. 3) are respectively mounted adjacent the other two opposed sides of table 40. As was the case with side support frame carrier 44, the two header carriers 50A and 50B are movable relative to machine frame 32 by hydraulic cylinders 52A, 52B fixedly mounted upon the machine frame and having piston rods 54A and 54B respectively coupled to the header carriers. The header carriers 50A, 50B are movable by their associated cylinders between a retracted position and an extended position in which the headers 12, which are detachably mounted upon the respective carriers, are located in their final assembled relationship to each other. The header carriers 50A and 50B are aligned with the fixed side frame carrier 42 in a fashion such that when the header carriers 50A and 50B are actuated to their extended position, the headers 12 carried on the header carriers are moved into their final assembled relationship with the side frame 14 carried on the fixed side frame carrier 42. When side frame carrier 44 is extended simultaneously with header carriers 50A and 50B, the side frames and headers are all located in their final assembled relationship with each other. Structural details of the carriers, guides, limit stops and the hydraulic circuit for controlling the actuation of cylinders 46, 52A, 52B have been omitted in that these are conventional and known to those skilled in the art. The means by which the side frames and headers are detachably mounted upon their carriers may take any of several forms and will vary with the structure of the particular side frames, endsheets and headers employed.

Figure 4:
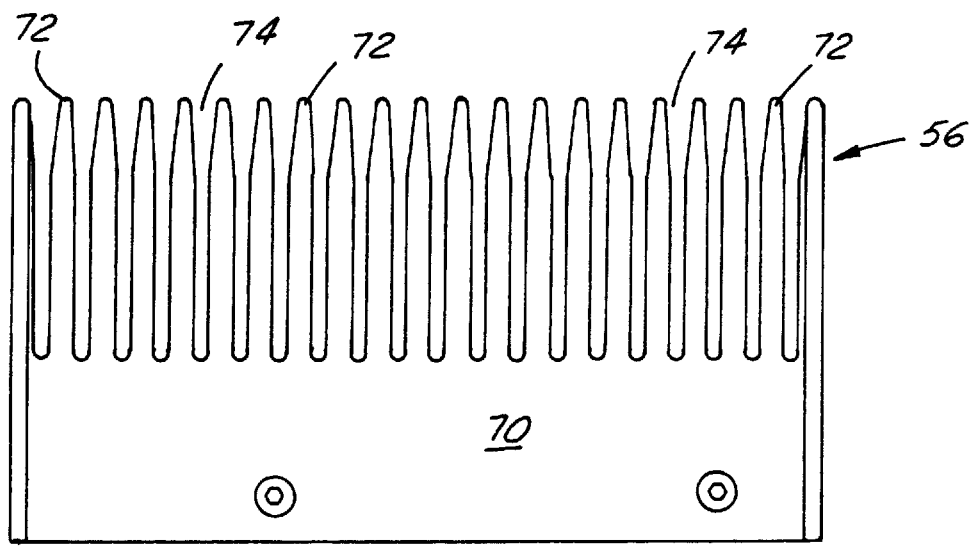
FIG. 4 is side elevational view of a tube aligning tool used in the apparatus of FIG. 1.

As shown in FIGS. 2–4, the apparatus further includes a pair of tube aligning means, such as guide members designated generally 56A and 56B which, as best seen in FIG. 2, are mounted upon the machine frame for vertical movement in planes closely adjacent the edges of table 40 and which are adjacent header carriers 50A and 50B. The guide members 56A and 56B are driven in vertical movement by vertical lifting hydraulic cylinders 58 (only one is shown) fixedly secured to machine frame 32 and having a piston rod 60 connected to assemblies 56A and 56B. In FIG. 2, guide members 56A and 56B are shown in their raised position above the surface of table 40. Upon retraction of piston rod 60, the guide members retract to a position below the plane of the surface of the table 40.

Further details of guide members 56A, 56B are shown in FIG. 4. The two guide members 56A and 56B are of identical construction, and the following description of member 56A is equally applicable to member 56B. Each guide member 56 is a generally comb-shaped, elongate member having a base portion 70 and a plurality of finger members 72 integrally formed with the base portion 70. The finger members 72 project in a first position vertically upwardly from the base portion 70 and define a plurality of upwardly opening, elongate, tube receiving slots 74 between them. Each of the slots 74 receives and aligns a tube therein, the tube being aligned for proper orientation prior to being inserted into the header assemblies as discussed above as well as to provide spacing between the tubes for the fins.

The guide members are formed from an elastomeric material having a hardness of between 80 to 90 shore D, and preferably between 82 to 85 shore D. The material with which the guide members are manufactured also needs a tensile strength of between 8500–9500 psi and a 100% elastic modulus strength of between 7500–8300 psi. These requirements are essential because the fingers must be able to elastically deform when a lateral force is applied and must return to their original, or first position when the force is removed. The most frequent occurrence of this type of force occurs when the tubes are misfed into the guide members. Occasionally, a plurality of tubes are fed into one slot, the slot being designed to receive only a single tube. When this happens, the finger members 72 are deflected from the first or design position. A machine operator will notice the misfeed, stop the assembly process and remove the misfed tubes. After the misfed tubes are removed, the finger member 72 must return to the first position, or the guide member should be replaced. It has been determined that forming the guide members 56 from an elastomeric material having the qualities stated above will provide finger members 72 which will elastically deflect under the force and return to the first or design position when the force is removed.

Many different types of materials have been tried, such as aluminum and various grades of steel and plastic. However, these materials were found to either be too soft in that the materials were incapable of aligning the tubes properly because of premature bending or too hard in which the finger members were plastically deformed and fail to return to their original shape. The preferred material for manufacturing the guide members 56 is a polyurthane elastomer formed from a polyether material known as "ANDUR® 82-DGP Prepolymer" and Curene® 442, both commercially available from the Anderson Development Company of Adrian, Mich. This material is a polyether (PTMG) based liquid, isocyanate terminated prepolymer. An elastomer of this material can be obtained when this prepolymer is cured with Curene® 442 [4,4'-methylene-bis (orthochloroaniline)]. The elastomer of this material, a polyurethane, has a hardness of 82 to 85 Shore D, a tensile strength of approximately 9000 psi and a 100% elastic modulus strength of approximately 7800 psi. A 100% elastic modulus strength is a measure of the force required to elongate the material by 100% of its original length.

The assembly sequence for making heat exchanger cores with the core building machine described above is well known to those skilled in the art, and therefore only a brief description is deemed necessary. An operator manually loads the headers and side frame supports into their respective carriers. The guide members are raised to a position extending above the plane of the table. A tube dispensing apparatus then places the required number of tubes into each slot between the guide member fingers. Fins are interposed between each row of tubes. The guide members 56 are lowered below the plane of the table and the core is compressed. The machine then actuates the side support carriers to properly place them and then the headers forced over the open ends of the tubes by the header carriers. The core subassembly is secured and moved to the next station for completion.

Many variations of the present invention will no doubt occur to those skilled in the art. It is the following claims, including all equivalents which define the scope of the present invention.

What is claimed is:

1. An apparatus for forming heat exchanger core assemblies comprising a plurality of generally elongate tubes in uniformly spaced, parallel relationship with each other with the opposite ends of the tubes seated in uniformly spaced openings in a pair of spaced parallel header members, said apparatus comprising:

a generally flat, horizontal support table;

a pair of header carriers mounted for horizontal reciprocatory movement respectively toward and away from two opposed sides of said table; and tube aligning means for locating and aligning a plurality of tubes on said table with the respective openings in header members carried by said header carriers, said tube aligning means comprising a pair of elongate, horizontally disposed guide members extending parallel to and respectively adjacent said opposed sides of said table, each of said guide members having a base portion, a plurality of finger members, each finger member projecting in a first position vertically upwardly from said base portion, and a plurality of upwardly opening elongate slots between said finger members extending parallel to the adjacent side of said table, said guide members being formed from an elastomeric material such that each of said finger members can be deformed elastically under imposition of a lateral force thereagainst and return to said first position when said force is removed.

2. An apparatus according to claim 1, wherein said elastomeric material is a polyurethane material.

3. An apparatus according to claim 2, wherein said guide members are formed from an elastomeric material having a hardness of between 70 to 85 Shore D.

4. An apparatus according to claim 2, wherein said guide members are formed from an elastomeric material having a hardness of between 82 to 85 shore D, a tensile strength of between 8500–9500 psi and a 100% elastic modulus strength of between 7500–8300 psi.

5. An apparatus according to claim 1, wherein said guide members are generally comb-shaped with said plurality of fingers being formed integrally with said base member.

6. An apparatus according to claim 5, wherein said guide members include a coloring agent.

7. An apparatus according to claim 1, further including means mounting said guide members for vertical movement between an operating position wherein said plurality of fingers project above said table and a retracted position wherein said plurality of fingers are located below the surface of said table.

8. An apparatus according to claim 7, further including a pair of opposed side support frame carriers, each adapted to detachably support an side support frame member of said core extending parallel to said tubes and located laterally between said headers, one of said side support frame carriers being fixedly mounted and the other side support frame carrier being mounted for horizontal movement toward and away from the fixedly mounted side support frame carrier.

9. An apparatus for forming heat exchanger core assemblies comprising a plurality of generally elongate tubes in uniformly spaced, parallel relationship with each other with the opposite ends of the tubes seated in uniformly spaced openings in a pair of spaced parallel header members, said apparatus comprising:

a generally flat, horizontal support table;

a pair of header carriers mounted for horizontal reciprocatory movement respectively toward and away from two opposed sides of said table;

a pair of opposed side support frame carriers, each adapted to detachably support an side support frame member of said core extending parallel to said tubes and located laterally between said headers, one of said side support frame carriers being fixedly mounted and the other side support frame carrier being mounted for horizontal movement toward and away from the fixedly mounted side support frame carrier a pair of generally comb-shaped, horizontally disposed guide members for locating and aligning a plurality of tubes on said table with the respective openings in header members carried by said header carriers, said guide members extending parallel to and respectively adjacent said opposed sides of said table, each of said guide members having a base portion, a plurality of finger members formed integrally with said base portion, each finger member projecting in a first position vertically upwardly from said base portion, and a plurality of upwardly opening elongate slots between said finger members extending parallel to the adjacent side of said table, said guide members being formed from a polyurethane material having a hardness of between 82 to 85 shore D, a tensile strength of between 8500–9500 psi and a 100% elastic modulus strength of between 7500–8300 psi such that each of said finger members can be deformed elastically under imposition of a lateral force thereagainst and return to said first position when said force is removed; and means mounting said guide members for vertical movement between an operating position wherein said plurality of fingers project above said table and a retracted position wherein said plurality of fingers are located below the surface of said table.

10. A tube aligning apparatus for use in a machine for assembling heat exchanger cores comprising a plurality of generally elongate tubes in uniformly spaced, parallel relationship with each other with the opposite ends of the tubes seated in uniformly spaced openings in a pair of spaced parallel header members, said tube aligning apparatus comprising:

a base portion;

a plurality of finger members, each finger member projecting in a first position vertically upwardly from said base portion, and defining a plurality of upwardly opening, elongate, tube receiving slots between said finger members, each one of said slots being configured to receive and align a tube therein; and wherein said base portion and said plurality of finger members being formed from an elastomeric material such that each of said finger members can be deformed elastically under imposition of a lateral force thereagainst and return to said first position when said force is removed.

11. An apparatus according to claim 10, wherein said elastomeric material is a polyurethane material.

12. An apparatus according to claim 11, wherein said guide members are formed from an elastomeric material having a hardness of between 80 to 90 shore D.

13. An apparatus according to claim 11, wherein said guide members are formed from an elastomeric material having a hardness of between 82 to 85 shore D, a tensile strength of between 8500–9500 psi and a 100% elastic modulus strength of between 7500–8300 psi.

14. An apparatus according to claim 11, wherein said guide members are generally comb-shaped with said plurality of fingers being formed integrally with said base member.

15. An apparatus according to claim 14, wherein said guide members include a coloring agent.

* * * * *